United States Patent [19]
Jackson et al.

[11] Patent Number: 5,287,352
[45] Date of Patent: Feb. 15, 1994

[54] METHOD AND APPARATUS TO REDUCE REGISTER OVERHEAD IN A SERIAL DIGITAL INTERFACE

[75] Inventors: Andrew W. Jackson; Long V. Nguyen, both of Austin, Tex.

[73] Assignee: Rolm Company, Santa Clara, Calif.

[21] Appl. No.: 916,054

[22] Filed: Jul. 17, 1992

[51] Int. Cl.[5] .............................................. H04J 3/22
[52] U.S. Cl. ........................................ 370/82; 370/84
[58] Field of Search ................ 370/55, 79, 82, 84, 370/99, 108, 110.1

[56] References Cited

U.S. PATENT DOCUMENTS

| | | | |
|---|---|---|---|
| 4,484,327 | 11/1984 | Hanson | 370/84 |
| 4,788,679 | 11/1988 | Kataoka et al. | 370/84 X |
| 4,953,180 | 8/1990 | Fieschi et al. | 370/84 X |

*Primary Examiner*—Douglas W. Olms
*Assistant Examiner*—Melvin Marcelo

[57] ABSTRACT

A method and apparatus for transferring data between telephony communications lines having different frame transmission rates. A downlink data frame according to a first protocol (e.g. a ROLMlink frame) is transmitted, at a first data rate, from a private branch exchange (PBX) to a telephone's network interface. One or more fields of data from this frame are collected in shift register which is internal to the interface. After collection, the data is injected into a downlink data frame of the telephone's internal protocol (e.g. a GCI frame), which is being transmitted on the telephone side of the interface at a second data rate (different from the first data rate). Simultaneously with the injecting, one or more fields of data from an uplink data frame of the telephone's internal protocol are shifted into the same register for later injection into an uplink data frame, of the external protocol, destined for the PBX. This later injection occurs simultaneously with data from another downlink data frame, from the PBX side of the interface, being collected in the register.

9 Claims, 7 Drawing Sheets

METHOD AND APPARATUS TO REDUCE REGISTER OVERHEAD IN A SERIAL DIGITAL INTERFACE

I. BACKGROUND OF THE INVENTION

A. Field of the Invention

This invention relates to telephony communications and related telephone bus protocols.

B. Related Art

A digital telephone may conventionally include at least two types of ports: a telephone line interface for connection with a telephone network, and a data communications interface for communications with a computer. For example, the ROLMphone (R) 244PC includes a telephony port for providing connection to a telephone network switch, such as a private branch exchange (PBX), and two data communications ports for providing connection to a computer.

In conventional telephones, the telephony communications link may be provided using a variety of protocols. For example, in the 244PC the connection to the network switch is accomplished by way of ROLMlink protocol. In many other conventional telephones, the connection to the switch is established by using an industry standard protocol such as ISDN.

A ROLMlink connection carries four types of information: digital data communications control, digital data communications, digital voice and general control. Digital data communications control refers to information concerned solely with controlling digital data connections and status. General control is concerned with control of the telephone as a whole. The information is organized into "fields" (groups of bits associated with one of the four information types). The fields are concatenated into a ROLMlink "frame" which contains one of each of the fields. Transfers on the link from the switch to the phone are said to be "downlink" while transfers from the phone to the switch are said to be "uplink".

Once the information arrives at the telephone, it is distributed to the telephone's various components by way of an internal bus. Conventionally, the telephony link is connected to the internal bus by way of a link interface, which translates the telephony information into the proper format and timing in accordance with the internal bus standard.

The internal bus may be one of a number of types. A conventional standard for such internal busses is General Circuit Interface (GCI). The GCI standard, describes, among other things, the structure of data frames and the timing of certain signals.

In prior art digital telephones, digitally encoded audio information arriving from the telephony link is sent from the link interface to a coder/decoder (CODEC). The CODEC is a digital-to-analog and analog-to-digital converter, specialized for telephone applications. The CODEC converts digital audio information into analog form to drive a speaker and/or handset, and converts the analog information from a microphone or handset to digital information destined for the telephone network switch.

Typically, the CODEC uses a timing pulse, generated by the link interface, to identify the particular time slot designated to hold the incoming or outgoing digital audio information within each data frame. Since the audio information is typically located in a fixed time slot within every frame, the link interface is conventionally set up once, at initialization time, to assert the timing pulse in coincidence with this fixed time slot.

II. SUMMARY OF THE INVENTION

Since telephony frames on either side of the bus interface may have different data transmission rates and formats, the present invention provides an improved method and apparatus for transferring data between telephony communications frames having different formats and data transmission rates.

According to a first aspect, the present invention provides a method of transferring data between telephony communications lines having different frame transmission rates, comprising the steps of: collecting, in a first register, a field of data within a first downlink data frame being transmitted at a first data rate; injecting the data collected in the first register, into a second downlink data frame having a second data rate different than the first data rate; and, simultaneously with the injecting, collecting in the first register, a second field of data from an uplink data frame being transmitted at said second rate.

According to a second aspect the present invention provides an apparatus for transferring data between frames of different data transmissions rates, comprising: a first multiplexer, connected to receive a first data frame being transmitted at a first data rate and a second data frame being transmitted at a second data rate; a shift register, connected to receive an output of the first multiplexing means; a second multiplexer connected to receive an output of the shift register and a third data frame being transmitted at the second data rate; and, control means, connected to the first multiplexing means, the second multiplexing means and the shift register, for a) causing the first multiplexing means to alternately supply the shift register with first field of data from the first data frame and a second field of data from the second data frame; b) for alternately clocking the shift register at the first data rate and the second data rate; and, c) for causing the second multiplexer to inject the first field of data into the third data frame simultaneously with reception of the second field of data by the shift register.

III. BRIEF DESCRIPTION OF THE DRAWING

The present invention will be better understood by reference to the drawing, wherein.

Like numbered reference numerals appearing in more than one figure represent like elements.

IV. DETAILED DESCRIPTION OF THE PREFERRED EMBODIMENT

Figure 1:
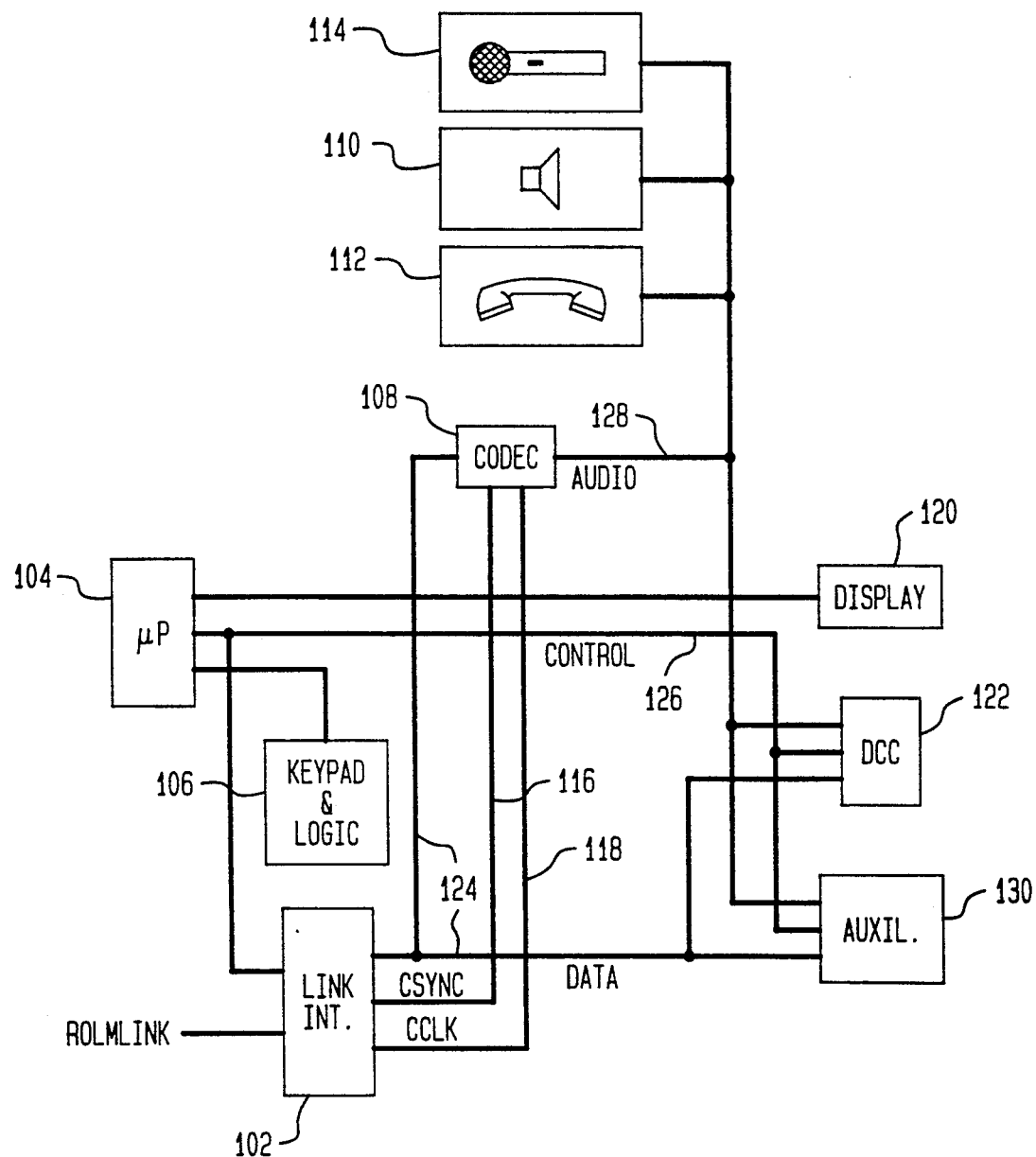
FIG. 1 is a diagram of a digital telephone according to an embodiment of the present invention.

An improved telephone, according to an embodiment of the present invention is illustrated schematically in FIG. 1. The telephone includes a link interface 102 which translates ROLMlink protocol to the telephone's internal bus protocol and which handles transfers of telephone control information between a microprocessor 104 and the ROLMlink line.

The microprocessor 104, is connected to the link interface 102. The microprocessor 104 controls all of the telephone functions, and is the source and destination for all communications with a PBX switch. Also connected to the link interface and the microprocessor is a keypad and associated control logic 106. The keypad/control logic 106 includes the telephone keys, lights and the associated control circuitry.

A coder/decoder (CODEC) 108 is connected to receive data output from the link interface 102. The CODEC 108 converts digital audio information into analog form to drive a speaker 110 and/or handset 112, and converts the analog information from a microphone 114 and/or the handset 112 to digital information destined for the network switch. The CODEC 108 is also connected to receive two clock signals from the link interface. The first of these signals, the CODEC sync (CSYNC) 116, tells the CODEC when to read a field in an data bus frame. The second, the CODEC clock (CCLK) 118, is a bit clock which runs at the bit transmission rate of the GCI bus.

A digital LCD display 120 is also connected to the microprocessor 104. The display 120 is used to display data such as the number dialed, stored telephone numbers and other data provided by way of the microprocessor 104.

A data communications controller (DCC) 122, controlled by the microprocessor 104, provides the telephone with two RS-232 data communications interfaces. The DCC 122 is connected to the link interface 102, the microprocessor 104 and the CODEC 108. Commands received by way of the RS-232 data communications ports are sent to the microprocessor by way of the data path. Data from an optionally connected RS-232 device flows through the telephone and ROLMlink to the switch, from which it flows to another line or device.

The data bus 124 is based on the conventional GCI specification for terminals (GCI terminal mode). The data bus uses the GCI electrical specifications, timing and signal lines as well as the overall GCI frame structure. In the preferred embodiment, however, the specific contents of the frame fields as well as their individual uses and protocols need not adhere to the GCI specification. For purposes of this document, the data bus frames will be referred to as GCI frames even though they need not fully comply with GCI field definition and protocol specifications. Each frame includes a field for the Data Communications and Data Control (DCDC), data communications, ROLMlink voice and auxiliary voice fields.

The control bus 126 is the path for phone control information which is sourced by the microprocessor. An audio bus 128 carries analog audio information and provides an analog path to and from the CODEC 108.

An auxiliary processing apparatus 130 is connected to the link interface 102, the microprocessor 104 and may also be connected to the CODEC 108. The auxiliary processing apparatus can be of a "plug in" type which is installable by the user. Such auxiliary devices may be used for a number of purposes. However, as related to the present invention, the auxiliary processing device is of a type which preprocesses digitally encoded audio information in a GCI frame destined for the CODEC. The microprocessor 104 detects the presence or absence of the auxiliary processing device 130 and receives related control parameters, described later, by way of a handshake data exchange between the two (104, 130) at telephone initialization time.

Figure 2:
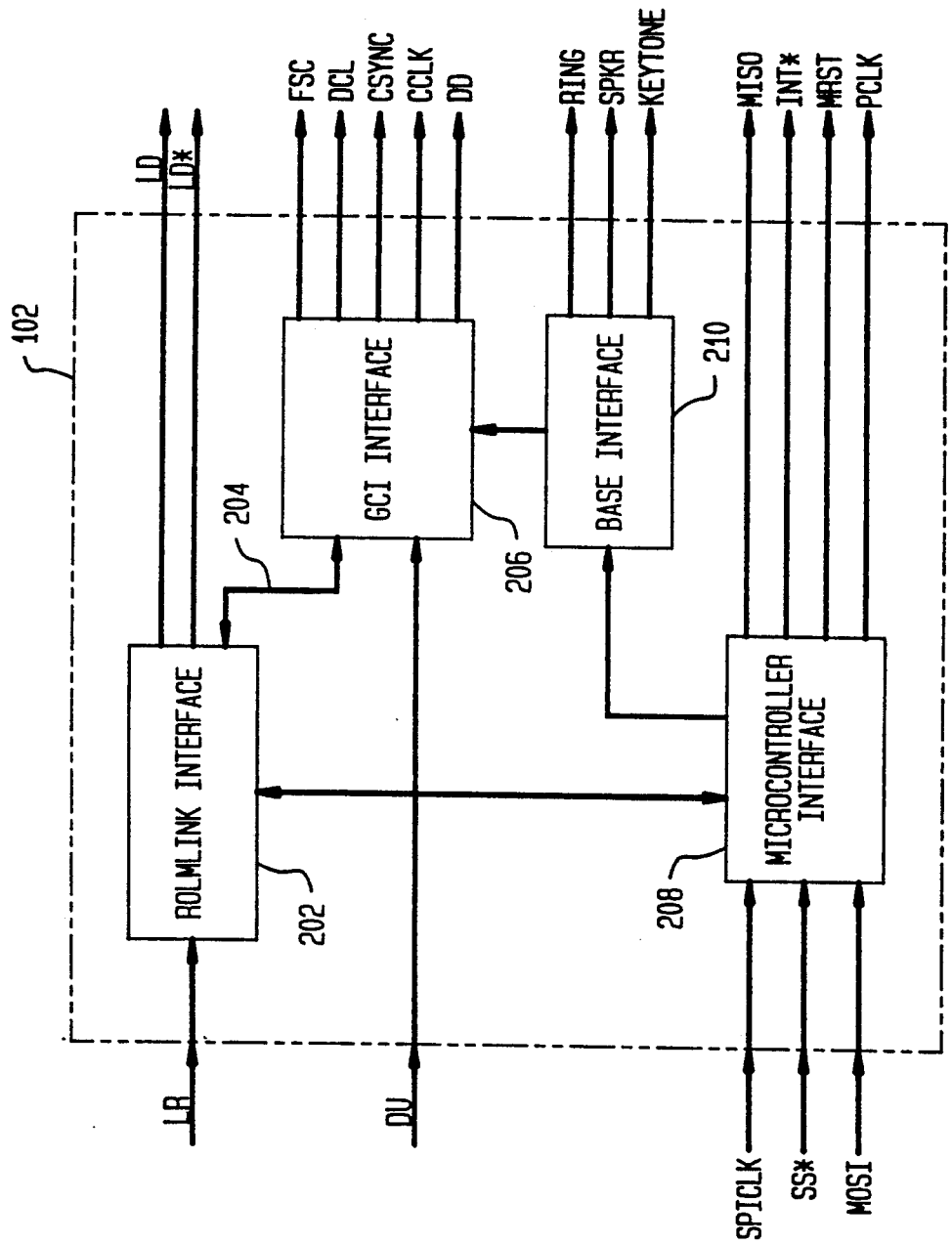
FIG. 2 is a more detailed diagram of the link interface of FIG. 1.

A more detailed view of the link interface 102 is shown in FIG. 2. The ROLMlink interface 202 receives downlink data (LR), in ROLMlink protocol, from the switch side of the telephone, and transfers the data to and from an internal bus 204 which, in turn, connects to a GCI interface 206. The ROLMlink interface also takes the data from the internal bus 204 and converts it into positive and negative uplink signals (LD, LD*) for transmission on the ROLMlink line. Control information is passed directly to a microcontroller interface 208.

The GCI interface 206 transfers information between the data bus 124 and the internal bus 204. The GCI interface 206 also generates the CSYNC and CCLK signals for the CODEC 108. The Data Downstream (DD) signal is the downlink GCI data generated by the GCI interface. Incoming or uplink GCI data is carried by the Data Upstream (DU) signal. The FSC signal is a frame sync which is indicative of the start of each data frame. The GCI Data Clock (DCL) is a clocking signal which runs at twice the GCI bus bit transmission rate in sync with bit transfers on the GCI bus.

A base interface 210 generates local phone control signals under control of the microprocessor 104. These signals include control information such as the ring tone output, the key tone output, speaker power-enable/-voice-active.

The microcontroller interface 208 handles communications between the ROLMlink interface 202 and the microprocessor 104. Incoming signals include those such as the Serial Peripheral Interface (SPI) data clock, SPI slave select, and SPI data in. The outgoing signals include, SPI data out, the processor interrupt output, external processor reset, and the processor clock.

Figure 5:
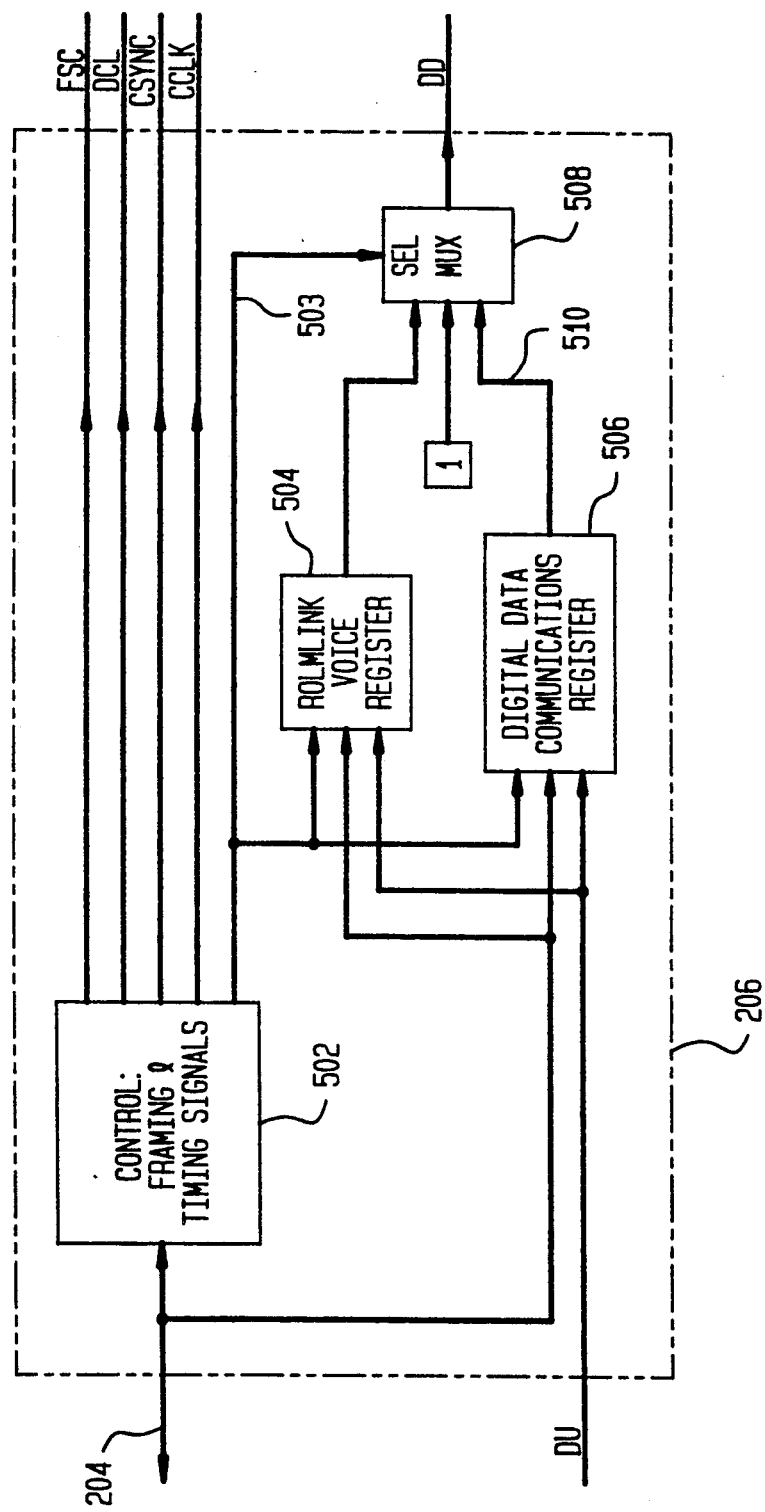
FIG. 5 is a more detailed illustration of the GCI interface of FIG. 2.

A more detailed diagram of the GCI interface 206 is shown in FIG. 5. Control and timing circuitry 502 is provided to issue the timing signals FSC, DCL, CSYNC and CCLK, and a number of other internal timing signals (on bus 503) which will be described in more detail later. A ROLMlink voice register 504 holds digital voice data being transferred between the ROLMlink and data bus 124 sides of the link interface 102. A digital data communications register 506 holds data communications and data control information (DCDC) and digital data communications information (DATA). A 3:1 multiplexer (MUX) 508 is connected to the ROLMlink voice register 504, the Digital Data Communications Register 506 (via line 510) and a "logical one" (high) level voltage source. The Control and timing circuitry is connected to the MUX 508 select inputs and controls the MUX 508 so as select which of the registers 504, 506 or the logical "1" are output to the GCI signal line DD.

The communications registers 506 can be embodied in a number of ways. For example, DCDC and data flowing downlink can be collected and held in a first "downlink register" and uplink information can be collected and held in a second "uplink" register. In this "two register" embodiment, the DCDC and data fields from the ROLMlink are collected in the "downlink" register and then transferred to the data bus 124 in the appropriate time slot within a GCI frame. At the same time that the "downlink" register is transferring data to the data bus 124, the "uplink" register collects uplink data from the data bus 124. At the appropriate time slot within a ROLMlink frame, the "uplink" register transfers it's data to the uplink ROLMlink data flow. While this transfer is occurring, the "downlink" register is collecting the next batch of downlink data.

Figure 6:
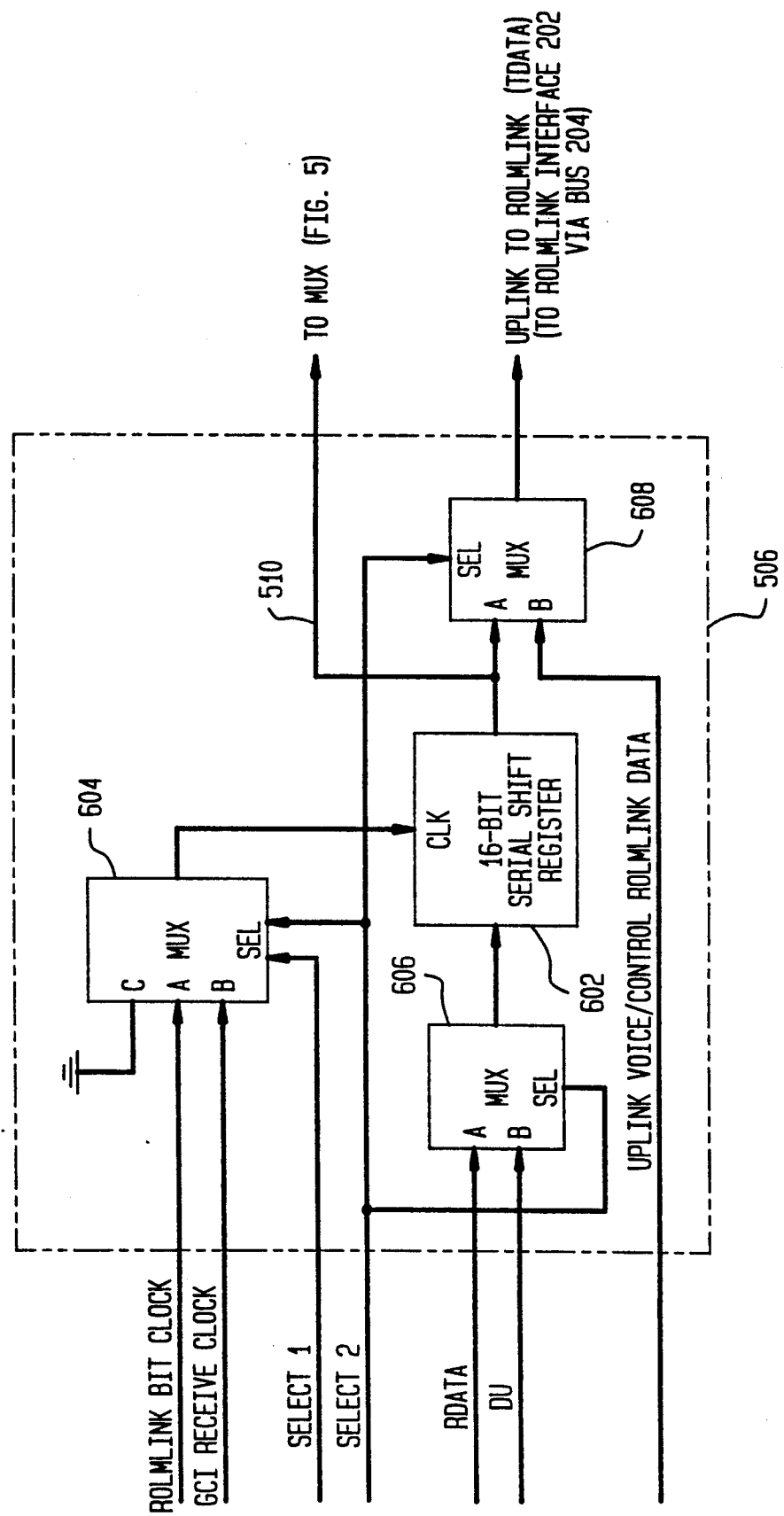
FIG. 6 is a more detailed illustration of the Digital Data Communications Register of FIG. 5; and, FIG. 7 is a timing diagram of the control signals used in the Digital Data Communications Register of FIG. 6.

An improved embodiment of the communications register is illustrated in FIG. 6. In the embodiment of FIG. 6, both downlink and uplink data are collected and transferred by one 16 bit serial shift register 602. The clocking of the serial shift register 602, and thus the timing of data collection, is selected by a 3:1 MUX 604. The three inputs to the MUX 604 are ground (no clocking), the ROLMlink bit clock and the GCI receive clock. The selection of the clocking signals (no clock, ROLMlink bit clock, GCI receive clock) is controlled by two select signals (SELECT1, SELECT2), generated by the timing and control circuitry 502 on bus 503.

Both the ROLMlink bit clock and the GCI receive clock are also generated by the timing and control circuitry 502 on bus 503. The ROLMlink bit clock is a bit rate clock for the ROLMlink frames. The GCI receive clock is a bit rate receive clock for the GCI frames. The GCI frames are three times as long as the ROLMlink frames (96 bits as compared with 32 bits) and are transmitted at a transmission rate three times that of the ROLMlink frames. Thus, the GCI receive clock runs at three times the rate of the ROLMlink bit clock.

The input of the shift register 602 is connected to the output of a first 2:1 MUX 606 which is, in turn connected to receive the ROLMlink data (from bus 204) and DU signals. The first 2:1 MUX 606 selects the data to be collected under control of the SELECT2 signal. A second 2:1 MUX 608, connected to the output of the shift register 602, selects the field in which to inject collected ROLMlink data into uplink ROLMlink data frames. The second 2:1 MUX is also controlled by the SELECT2 signal.

Figure 7:
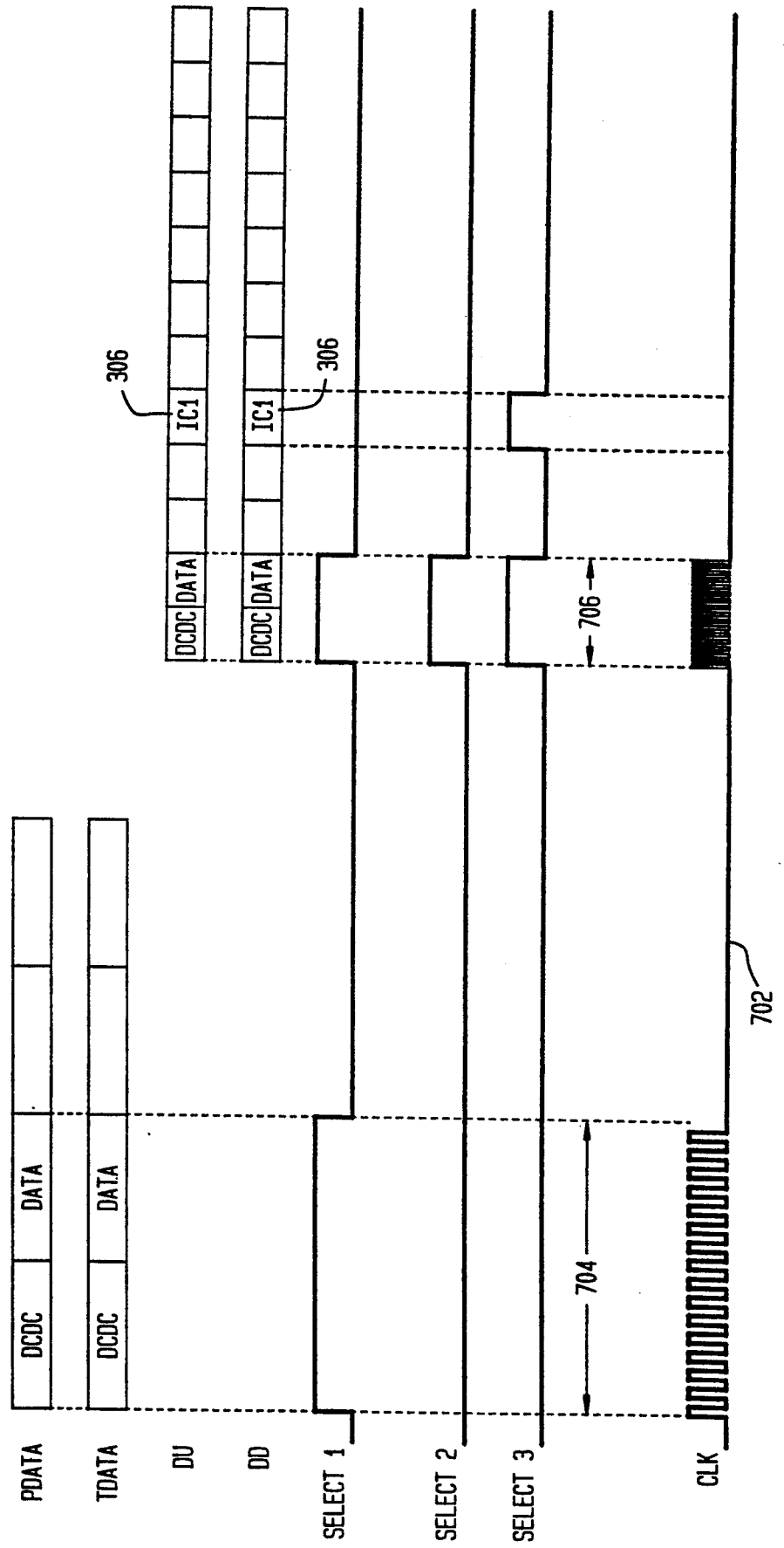

The timing of the control and clocking signals related to FIG. 6 are illustrated in FIG. 7. The CLK waveform 702 represents the output of the 3:1 MUX 604. The 3:1 MUX 604 selects it's ground input (input A) when SELECT1 is low. When SELECT1 is high, the MUX 604 selects input A when SELECT2 is low and input B when SELECT2 is high. Similarly, the 2:1 MUXes 606, 608 will select input A when SELECT2 is low and input B when SELECT2 is high.

The 3:1 MUX 508 of FIG. 5 operates under control of the SELECT2 and SELECT3 signals. As with SELECT1 and SELECT2, the SELECT3 signal is generated by the timing and control circuitry 502 on bus 503. When SELECT3 is low, MUX 508 will select its "high" (logical "1") input. When SELECT3 is high, MUX 508 will select the output of register 506 (the GCI frame DCDC and DATA fields) when SELECT2 is high and the output of register 504 (the ROLMlink voice field) when SELECT2 is low.

During time period 704, downlink ROLMlink data (RDATA) is collected in the register 602. At the same time, uplink ROLMlink data (TDATA), previously collected from the data bus 124 (as DU) is transferred on the output of the second 2:1 MUX 608 to the uplink ROLMlink line. Later, during time period 706, when the appropriate GCI frame fields are present, the uplink GCI frame data is collected in the register 602, while the previously collected ROLMlink data is transferred (as DD) to a downlink bound GCI frame via MUX 508 (FIG. 5).

It should be understood that the logic of FIG. 6 is not limited to frame types having the same field position definitions. By varying the timing of the SELECT1, SELECT2 and SELECT3 control signals, one or more fields from a position within a first frame of a first format or type (e.g. a ROLMlink frame) can be injected into a different field position within a second frame of a second format or type (e.g. a GCI frame). For example, DCDC and DATA fields in positions one and two (as shown in the RDATA and TDATA frames of FIG. 7) can be injected into positions three and five of a another frame.

Figure 3:
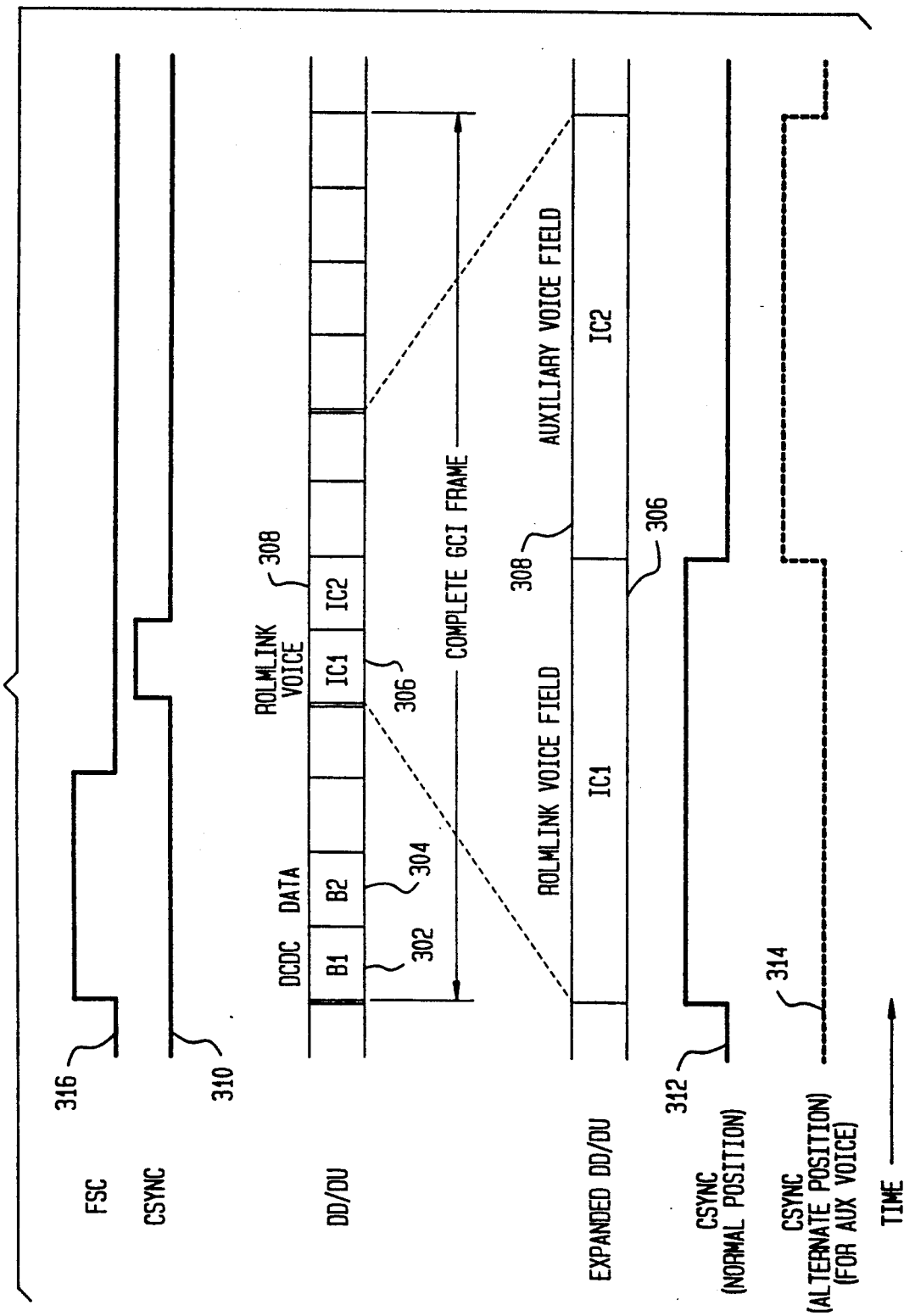
FIG. 3 is a timing diagram illustrating relationship between the data frame voice fields and the CODEC clock signals according to an embodiment of the present invention.

A more detailed example of a GCI frame is illustrated in FIG. 3. As with the incoming ROLMlink frame, the GCI frame includes a number of fields. In accordance with an embodiment of the present invention, the GCI frames include a DCDC field 302, a DATA field 304, a ROLMlink voice field 306 and an Auxiliary Voice field 308. The DCDC field contains control information related solely to the ROLMlink DATA field. The DATA field 304 contains the raw, digital data communications information, the ROLMlink voice field 306 contains the digitally encoded voice information taken from the ROLMlink line. The Auxiliary Voice field is put to special use. Specifically, this field contains processed digital voice information from or to a downlink auxiliary device.

Figure 4:
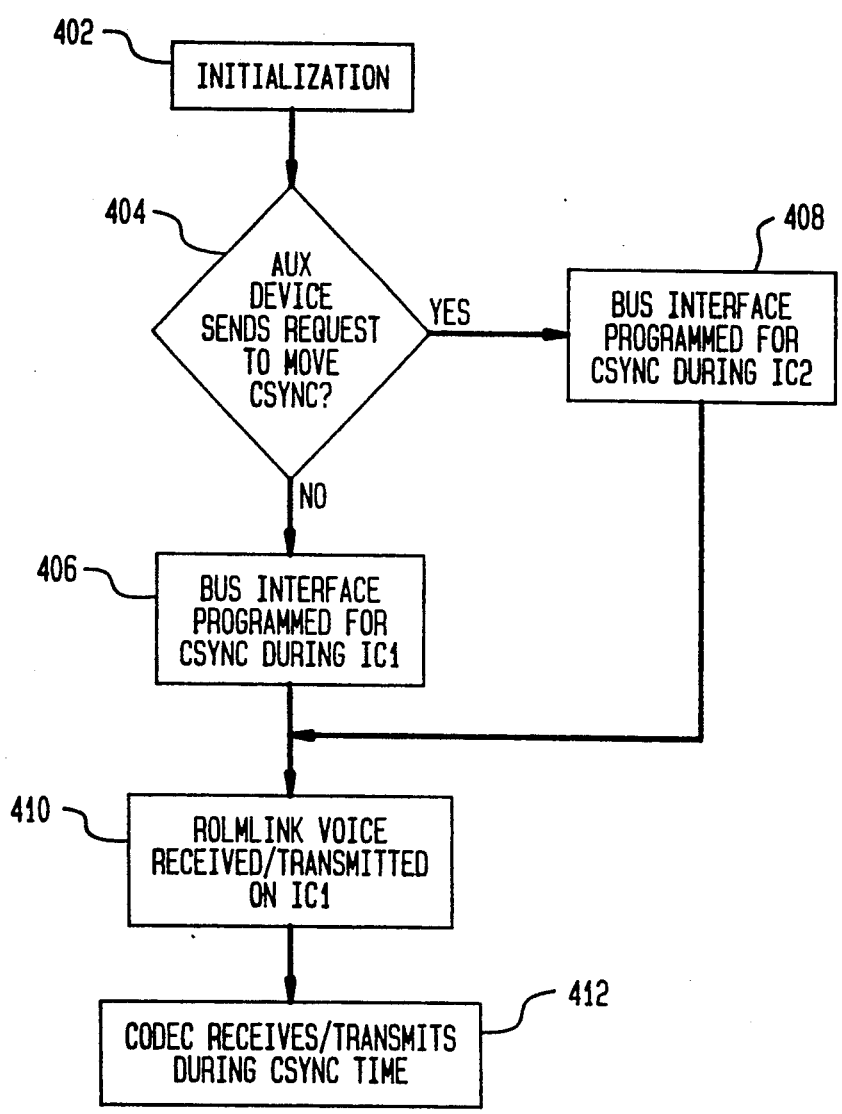
FIG. 4 is a flow chart of the operation of the telephone of FIG. 1 according to an embodiment of the present invention.

The operation of a telephone auxiliary device according to an embodiment of the present invention will be better understood by reference to FIG. 4. When the telephone is initialized, in step 402 the presence or absence of an AUXILIARY device is detected by the microprocessor by way of signals of the control bus. If the AUXILIARY device is not present, no request is received to move CSYNC in step 404. Thus, in step 406, the microprocessor programs the link interface to assert CSYNC in coincidence with the timeslot for the ROLMlink voice field (as illustrated by waveform 312). If the AUXILIARY device is present, at initialization time it sends control data, to the microprocessor, indicative of the time slot in which CSYNC is to be asserted. If this signal is detected in step 402, in step 408 the microprocessor, in turn, programs the link interface to assert CSYNC at the commencement of the time slot requested by the AUXILIARY device. Thus, in step 412, the auxiliary device, if present, intercepts the voice data received from the appropriate field in a GCI frame and retransmits the processed data during the programmed CSYNC time slot determined by step 408. If no auxiliary device is present, the CSYNC will be determined by step 406.

Whenever a telephony frame arrives from the telephony link, the link interface converts it to a GCI frame. Where the frame is transferred as part of a "voice" connection (as indicated by a control message within the general control field) the link interface sends the GCI frame to the auxiliary device. The GCI frame and the CSYNC signal are also sent to the CODEC. In contrast to the conventional link interfaces, however, the link interface of the present invention does not assert the CSYNC signal until the time slot requested by the AUXILIARY device. Thus, the auxiliary device has the opportunity to process the digital voice data, place the data in a later fixed time slot (the auxiliary voice field) 308. As described above, the AUXILIARY device communicates with the microprocessor at initialization time so as to cause CSYNC to be asserted only during the auxiliary voice field time slot 308 (as illustrated by waveform 314).

In step 410, the Auxiliary device receives the GCI frame. The AUXILIARY device uses the Data Clock (DCL) and Frame Sync (FSC) signal (waveform 316), generated by the link interface, to determine which time slot is occurring. The FSC signal indicates when the link interface has commenced transmission of a frame on the data bus 124. The data clocks are generated by the link interface at twice the bit transmission rate on the data bus 124. At the commencement of the FSC signal, the AUXILIARY device begins to count Data Clocks to determine the current bit position. From the perspective of the link interface, once transmission of the frame has been commenced, the link interface counts the number of data clocks (DCL). Since the AUXILIARY device knows that the ROLMlink voice field will always be in the same time slot within each frame (and thus starting at the same bit position), it counts the data clocks to determine when to start reading the voice data. For example, where the ROLMlink voice data is in the GCI IC1 position, the AUXILIARY device will start capturing data on the fifth field of data (i.e. the 66th bit clock given 8 bit data fields).

After the AUXILIARY device has completed processing of the digital voice data, in step 412 it inserts the processed data into a later time slot in the same or a subsequent frame. This time slot is referred to as the AUXILIARY voice field 308.

As previously described, the AUXILIARY device signals the link interface, at initialization time, to raise the CSYNC signal such that the CODEC will read the AUXILIARY voice field rather the ROLMlink voice field. Thus, the processed data is made available to the CODEC in a time slot (within the same or a subsequent frame) determined by the AUXILIARY device.

As an alternative embodiment, the AUXILIARY device can program the timing of the CSYNC signal on the fly. In other words, the AUXILIARY device can process the data, determine which time slot to place the processed data within (based on actual or projected processing requirements) and then program the link interface to generate CSYNC accordingly.

The AUXILIARY field selected for the processed data does not need to directly follow the ROLMlink voice frame (IC1). Further, the AUXILIARY device can place the processed data into an AUXILIARY field within a subsequent frame and program the link interface to generate CSYNC accordingly. For example, where several frames (e.g. 3) of ROLMlink voice data need to be processed in order to obtain a result, the result can be placed in several fields of the last frame needing to be merged and several CSYNC signals (e.g. 3) generated accordingly.

The forgoing principles apply to both uplink and downlink data. In the data bus 124, frames of uplink data are sent on one carrier (bus line) in synchronism with frames of downlink data sent on a second carrier. Thus, timing of CSYNC can be programmed such that the CODEC will place unprocessed uplink data into the auxiliary voice field. This uplink data can then be processed by the AUXILIARY device and placed in the ROLMlink voice field of the same or a subsequent frame for transmission on the telephony line.

As an alternative to moving the CSYNC signal, the link interface can be programmed to change the position of the ROLMlink voice field when an auxiliary device is present. In this embodiment, the microprocessor 104 detects the presence of the AUXILIARY device 130 via a handshake at telephone initialization time. In response to detection of the AUXILIARY device 130, the microprocessor programs the link interface 102 to place the ROLMlink voice field (from incoming ROLMlink frames) into the IC2 position of downlink GCI frames and to expect the ROLMlink voice field in the IC2 position of uplink GCI frames. The CSYNC signal remains programmed for the IC1 time slot. Once this has been accomplished, the AUXILIARY device handles downlink frames by processing the data from the IC2 position and placing the results into the IC1 position. For uplink frames, the AUXILIARY device 130 processes data from IC1 and places the results into IC2.

The forgoing principles can also be applied to data other than digital voice data. For example, by manipulating the position of the CSYNC signal in telephones and other devices having a video CODEC, the AUXILIARY device can process downlink or uplink video data from a first field of one frame and then put the processed data into a subsequent field of the same or a later frame.

Now that the invention has been described by way of the preferred embodiment, various enhancements and improvements which do not depart from the scope and spirit of the invention will become apparent to those of skill in the art. The preferred embodiment is described as an example and not as a limitation. The scope of the invention is defined by the appended claims.

We claim:

1. A method of transferring data between telephony communications lines having different frame transmission rates, comprising the steps of:
   (a) collecting, in a first register, a field of data within a first downlink data frame being transmitted at a first data rate;
   (b) injecting the data collected in the first register, into a second downlink data frame having a second data rate different than the first data rate; and,
   (c) simultaneously with the injecting, collecting in the first register, a second field of data from an uplink data frame being transmitted at said second rate.

2. The method of claim 1 comprising the further step of: after step (c) and simultaneously with a repetition of step (a), injecting the second field of data into an uplink data frame being transmitted at the first data rate.

3. The method of claim 1 wherein the first field of data comprises data communications and control (DCDC) information.

4. The method of claim 1 wherein the first downlink data frame and the second downlink data frame are of different formats;

5. The method of claim 1 wherein two fields of data are collected from the first downlike data frame in step (a) and wherein the two fields of data are injected into the second downlink data frame in step (b).

6. The method of claim 2 wherein the first field of data and the second field of data each comprise data communications and control (DCDC) information.

7. The method of claim 5 wherein the two fields of data comprise a data communications and control (DCDC) field and a telephony data (DATA) field.

8. An apparatus for transferring data between frames of different data transmissions rates, comprising:
- a first multiplexer, connected to receive a first data frame being transmitted at a first data rate and a second data frame being transmitted at a second data rate;
- a shift register, connected to receive an output of the first multiplexing means;
- a second multiplexer connected to receive an output of the shift register and a third data frame being transmitted at the second data rate; and,
- control means, connected to the first multiplexing means, the second multiplexing means and the shift register, for a) causing the first multiplexing means to alternately supply the shift register with first field of data from the first data frame and a second field of data from the second data frame; b) for alternately clocking the shift register at the first data rate and the second data rate; and, c) for causing the second multiplexer to inject the first field of data into the third data frame simultaneously with reception of the second field of data by the shift register.

9. The apparatus of claim 8, further comprising:
- a third multiplexer connected to receive an output of the register and a fourth data frame being transmitted at the first data rate;
- wherein the control means further comprises means for causing the third multiplexer to inject the second field of data into the fourth data frame, simultaneously with reception, by said register, of another data frame being transmitted at the first data rate.

* * * * *